US008673995B2

(12) United States Patent
Chatterjee et al.

(10) Patent No.: US 8,673,995 B2
(45) Date of Patent: Mar. 18, 2014

(54) RADIATION CURABLE POLY(ISOBUTYLENE) ADHESIVE COPOLYMERS HAVING PENDENT AMINE GROUPS

(71) Applicant: 3M Innovative Properties Company, St. Paul, MN (US)

(72) Inventors: Joon Chatterjee, Bloomington, MN (US); Hae-Seung Lee, Woodbury, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/713,514

(22) Filed: Dec. 13, 2012

(65) Prior Publication Data

US 2013/0102699 A1  Apr. 25, 2013

Related U.S. Application Data

(63) Continuation-in-part of application No. 13/163,791, filed on Jun. 20, 2011, now abandoned.

(51) Int. Cl.
*C08J 3/28* (2006.01)
*C08F 2/46* (2006.01)
*C08G 61/04* (2006.01)

(52) U.S. Cl.
USPC ............... 522/126; 522/113; 522/1; 520/1

(58) Field of Classification Search
USPC ............... 522/126, 113, 1; 520/1
See application file for complete search history.

(56) References Cited

U.S. PATENT DOCUMENTS

| | | | |
|---|---|---|---|
| 4,181,752 A | 1/1980 | Martens et al. | |
| 4,256,857 A * | 3/1981 | Buckler et al. | 525/379 |
| 4,329,384 A * | 5/1982 | Vesley et al. | 428/41.3 |
| 5,227,426 A | 7/1993 | Tse | |
| 5,376,503 A | 12/1994 | Audett | |
| 5,378,758 A | 1/1995 | Amici | |
| 5,459,174 A | 10/1995 | Merrill | |
| 5,567,775 A | 10/1996 | Wang | |
| 5,602,221 A | 2/1997 | Bennett | |
| 6,063,838 A | 5/2000 | Patnode | |
| 6,617,020 B2 | 9/2003 | Zhou | |
| 6,630,238 B2 | 10/2003 | Hyde | |
| 6,632,522 B1 | 10/2003 | Hyde | |
| 6,733,893 B2 * | 5/2004 | Suzuki et al. | 428/447 |
| 2005/0000642 A1 * | 1/2005 | Everaerts et al. | 156/273.1 |
| 2005/0171315 A1 | 8/2005 | Wakabayashi | |
| 2006/0041084 A1 * | 2/2006 | Stokes et al. | 525/375 |

FOREIGN PATENT DOCUMENTS

| | | |
|---|---|---|
| GB | 1 448 329 | 9/1976 |
| WO | WO 92/11295 | 7/1992 |
| WO | WO 02/31039 | 4/2002 |
| WO | WO 03/076537 | 9/2003 |
| WO | WO 2006/093702 | 9/2006 |
| WO | WO 2012/044417 | 4/2012 |

OTHER PUBLICATIONS

Endo, "Antimicrobial activity of tertiary amine covalently bonded to a polystyrene fiber",*Applied & Environmental Microbiology*, vol. 53, No. 9, 2050-2055 (1987).

Wakabayashi, "Studies on s-Triazines.I. Cotrimerization of Trichloroacetonitrile with Other Nitriles," *Bulletin of the Chemical Society of Japan*, vol. 42, pp. 2924-2930 (1969).

* cited by examiner

*Primary Examiner* — Ling Choi
*Assistant Examiner* — Jessica E Whiteley
(74) *Attorney, Agent, or Firm* — Kent S. Kokko

(57) ABSTRACT

The disclosure provides pressure-sensitive adhesives and adhesive sealants prepared from amine-modified, crosslinked isobutylene copolymers, and tape articles prepared therefrom.

18 Claims, No Drawings

RADIATION CURABLE POLY(ISOBUTYLENE) ADHESIVE COPOLYMERS HAVING PENDENT AMINE GROUPS

TECHNICAL FIELD

This invention relates to pressure-sensitive adhesives and adhesive sealants prepared from isobutylene copolymers, and tape articles prepared therefrom. The pressure-sensitive adhesives are characterized by exhibiting an overall balance of adhesive and cohesive characteristics and exceptional adhesion to low surface-energy substrates.

BACKGROUND

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, pressure-sensitive adhesives (PSAs) are known to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize a PSA.

With broadened use of pressure-sensitive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

There are a wide variety of pressure sensitive adhesive (PSA) materials available today that include natural crude or synthetic rubbers, block copolymers, and acrylic ester based polymeric compositions. Central to all PSAs is a desired balance of adhesion and cohesion that is often achieved by optimizing the physical properties of the acrylic elastomer, such as glass transition temperature and modulus. For example, if the glass transition temperature ($T_g$) or modulus of the elastomer is too high and above the Dahlquist criterion for tack (storage modulus of $3 \times 10^6$ dynes/cm$^2$ at room temperature and oscillation frequency of 1 Hz), the material will not be tacky and is not useful by itself as a PSA material. Often in this case, low molecular weight, high $T_g$ resin polymers (tackifiers) or low molecular weight, low $T_g$ polymers (plasticizers) are often used to modulate the $T_g$ and modulus into an optimal PSA range.

SUMMARY

The adhesive (co)polymers of this disclosure comprise: a) an isobutylene copolymer having pendent dialkylamine groups, b) a photocrosslinking agent, and c) a tackifier. In one aspect the pressure-sensitive adhesive comprises the interpolymerized reaction product of isobutylene and at least one monomer having a pendent dialkylamine (tertiary) and/or quaternary amine groups.

The pressure-sensitive adhesives of this disclosure provide the desired balance of tack, peel adhesion, and shear holding power, and further conform to the Dahlquist criteria; i.e. the modulus of the adhesive at the application temperature, typically room temperature, is less than $3 \times 10^6$ dynes/cm at a frequency of 1 Hz.

In some embodiments, hot melt adhesive compositions are provided which applied to substrates from the melt. Such hot melt adhesive compositions are substantially solvent-free. Hot melt adhesives are versatile and widely used in industrial applications, such as bookbindings, cardboard boxes, plastic parts and wooden articles, among others. They are generally 100% solid adhesives with application temperatures which vary from about 150 to about 180° C.

In recent years, there has been a significant increase of the usage of low surface energy, olefin-based thermoplastics (e.g., polyethylene, polypropylene, ethylene propylene diene monomer rubber (EPDM)) in automotives, paints, appliances and electronics markets. The advantages of the new materials include affordable cost, easy processibility, and excellent mechanical properties. However, this trend creates a challenge in terms of making adhesive bonds to these low energy surfaces.

When considering adhesive tapes, pressure-sensitive adhesive (PSA) tapes are the easiest to use, but for the most part, pressure-sensitive adhesives do not adhere well to low surface energy substrates. Additionally, most PSAs are unsuited for uses requiring good internal (cohesive) strength at elevated temperatures. For example, rubber-resin PSAs tend to soften and degrade when heated. PSAs based on styrene-containing block copolymers also do not retain good internal strength when heated, because styrene has a low $T_g$ and so softens at moderately elevated temperatures. Currently the bonding to low surface-energy surfaces is achieved by priming the substrate with polar liquid followed by application of PSAs. Even after this two step process, the existing PSAs do not fulfill customer requirements. There is need to develop primerless LSE PSAs at competitive cost but still with the most optimized properties.

Recently, polyisobutylene (PIB) has been considered as an attractive material for low surface energy (LSE) bonding applications due to its excellent adhering properties on olefin-based thermoplastics. In addition, the excellent moisture and oxygen barrier properties of PIB suggest that PIB-based materials have potential use in electronic and photovoltaic encapsulation applications. In spite of its beneficial properties, low cohesive strength of the material has limited the uses for high shear applications. Another possible application for PIB-based material is in the medical adhesive field. Most acrylate-based PSAs are not suitable for medical application since acrylate PSAs tend to give off toxic vapors at elevated temperatures. Acrylate-based PSAs typically contain monomeric materials which, even at ordinary room temperatures, exude odors that make acrylate PSA tapes generally unsuitable for medical uses. Polyisobutylene PSAs are often used for medical uses because they are physiologically inert, but again they tend to be deficient in internal strength.

The adhesive compositions of the present disclosure provide an improved pressure-sensitive and hot-melt adhesive composition which may be adhered to a variety of substrates, including low surface-energy (LSE) substrates, within a wide temperature range and provide good adhesive strength and holding characteristics. The adhesive compositions are easily handled, and are environmentally friendly due to the low volatile organic compound (VOC) content, such as solvents. The adhesive compositions of the present disclosure further provide a pressure-sensitive adhesive article, such as adhesive tapes and sealants.

As used herein:

"alkyl" means a linear or branched, cyclic or acyclic, saturated monovalent hydrocarbon having from one to about twelve carbon atoms, e.g., methyl, ethyl, 1-propyl, 2-propyl, pentyl, and the like.

"alkylene" means a linear saturated divalent hydrocarbon having from one to about eighteen carbon atoms which may be linear or branched, cyclic or acyclic, e.g., methylene, ethylene, propylene, 2-methylpropylene, pentylene, cyclohexylene, and the like.

"aryl" means a monovalent aromatic, such as phenyl, naphthyl and the like.

"arylene" means a polyvalent, aromatic, such as phenylene, naphthalene, and the like.

"hydrocarbyl" is inclusive of aryl and alkyl.

DETAILED DESCRIPTION

The adhesive copolymer comprises an isobutylene copolymer having pendent tertiary and/or quaternary amine groups, b) a photocrosslinking agent, and optionally c) a tackifier. In one aspect the pressure-sensitive adhesive comprises the interpolymerized reaction product of isobutylene and at least one monomer having pendent hydrocarbyl amine groups, including those derived from secondary and tertiary amines.

The monomer having pendent, free-radically polymerizable, ethylenically unsaturated groups may be derived from halogenated butyl rubber and is of the general formula:

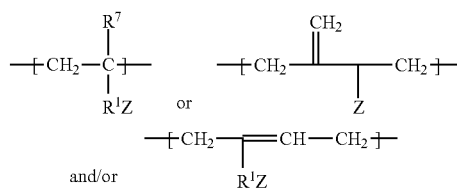

wherein $R^1$ is a divalent alkylene or arylene, and Z is a pendent tertiary or quaternary amine group and $R^7$ is H or $CH_3$. More particularly, the isobutylene copolymer may be of the formula;

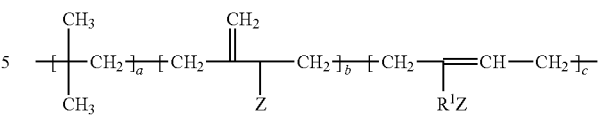

wherein a is at least 20, and at least one of b and c are at least one, $R^7$ is a divalent alkylene or arylene and Z is pendent hydrocarbyl amine group; or

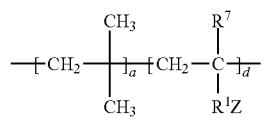

wherein a and d are at least 1, preferably a is at least 20, d is at least one, $R^7$ is H or $CH_3$, $R^1$ is a divalent alkylene or arylene and Z is a pendent hydrocarbyl amine group.

The Z group is a pendent amine group of the formulas $-NR^2R^3$ or $-(NR^2R^3R^4)^+$, where $R^2$ is a $C_1$-$C_{18}$ alkyl, and each of $R^3$ and $R^4$ are independently a $C_1$-$C_{18}$ (cyclo)alkyl or an aryl group. $R^3$ and $R^4$ may be taken together to form a cyclic amine, e.g. a morpholine ring. Preferably the amino groups have at least one hydrogen atom alpha to the nitrogen atom. In other words, preferably the alkyl groups are not tertiary alkyl groups. It is believed that the hydrogen atoms alpha to the nitrogen are abstracted during the photocrosslinking reaction, yielding a relatively stable alpha radical. Desirably, the amine groups contain no nitrogen bonded hydrogen atoms (N—H) as it interferes with the crosslinking reaction.

With respect to the copolymers of Formulas I and II it will be recognized that the monomer units having the subscript "a" are interpolymerized isobutylene monomer units. Further, with regard to Formulas I and II, the subscripts "b" and "c" or "d" are chosen such that the copolymer comprises 1 to 20 wt. % of the respective monomer units: e.g. b, c and d are such that the $—R^1—Z$ monomer units comprise 1 to 20 wt. % of the copolymer.

The copolymer of Formulas I and II are generally prepared by nucleophilic displacement of commercially available halogenated PIBs, including halogenated poly(isobutylene-co-methylstyrene), halogenated poly(isobutylene-co-isoprene) with a secondary or tertiary amine. Alternatively, a non-halogenated PIB-based material may be halogenated, then subsequently substituted with a secondary or tertiary amine. The halogen moiety in those materials allows introduction of the pendent tertiary or quaternary amine groups by displacement with a secondary or tertiary amine of the formulas $H—NR^2R^3$ or $NR^2R^3R^4$.

Useful secondary amines include dimethylamine, diethylamine, ethylmethylamine, dipropylamine, diisopropylamine, di-n-butylamine, methyl hexyl amine, ethyl butyl amine, diisobutylamine, di-sec.-butylamine, dipentylamine, dihexylamine, dioctylamine, phenylmethylamine, ethylnapthylamine, dicyclopentylamine, dibenzylamine, diphenylethylamine, diphenylamine, dinaphthylamine and dicyclohexylamine.

Useful tertiary amines include 1-methyl-4-dimethylaminoethyl piperazine, dimethyl benzylamine, triethylamine, methyldiethylamine, trimethylamine, phenylmethylethylamine, dimethylpropylamine trimethylamine, tripropylamine, triisopropylamine, tri-n-butylamine, triisobutylamine, tripentylamine, trihexylamine, trioctylamine, triethanolamine, tricyclopentylamine, tricyclohexylamine, tribenzylamine, triphenylethylamine, triphenylamine, trinaphthylamine.

The reaction scheme involves a displacement reaction with an amine of the formula H—$NR^2R^3$ or $NR^2R^3R^4$, where $R^2$ is a $C_1$-$C_{18}$ (cyclo)alkyl, and each of $R^3$ and $R^4$ are independently a $C_1$-$C_{18}$ (cyclo)alkyl or an aryl group. $R^3$ and $R^4$ may be taken together to form a cyclic amine, e.g. a morpholine ring. Preferably the amino groups have at least one hydrogen atom alpha to the nitrogen atom. In other words, preferably the alkyl groups are not tertiary alkyl groups. As can be seen the isobutylene copolymer having pendent tertiary or quaternary amine groups is prepared by nucleophilic displacement of a halogenated isobutylene copolymer, with an secondary or tertiary amine. In Scheme 1, the copolymer of Formula II is shown, but a similar scheme may be shown for the copolymers of Formula I.

In some embodiments a catalyst may be added. Useful catalysts are known in the art and include, for example, tetrabutylammonium bromide (TBAB), tetraalkyl phosphonium halides, alkylarylphosphonium halides, alkyl ammonium halides, and alkyl phosphonium halides.

Scheme 1.

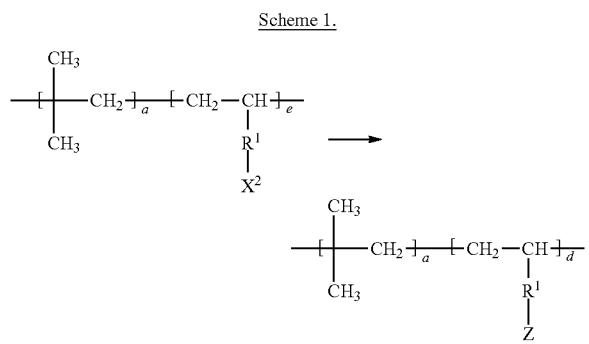

wherein a is at least 20, and b is least one,
$X^2$ is a leaving group such as a halide, and preferably a bromide,
$R^1$ is a divalent hydrocarbyl, including alkylene or arylene;
Z is a tertiary amine of the formula —$NR^2R^3$ or a quaternary amine of the formula —$(NR^2R^3R^4)^+$, where $R^2$ is a $C_1$-$C_{18}$ (cyclo)alkyl, and each of $R^3$ and $R^4$ are independently a $C_1$-$C_{18}$ (cyclo)alkyl or an aryl group
a is at least 20, d (or e) is at least one. In some preferred embodiments, $R^1$ is a phenylene.

Alternately, the copolymer having pendent tertiary amine groups may be prepared, and converted to a quaternary amine with the use of alkylating agents. Any of the alkylating agents known and described in the art may be used, including dialkyl sulfates (e.g., dimethyl sulfate, diethyl sulfate, and dipropyl sulfate), alkyl halides (e.g., methyl iodide, methyl chloride, methyl bromide, ethyl iodide, ethyl bromide and ethyl iodide), alkyl p-toluenesulfonates (e.g., methyl p-toluenesulfonate), alkyl perfluoroalkanesulfonates (e.g., methyl perfluoromethanesulfonate, 2,2,2-trifluoroethyl perfluorobutanesulfonate and methyl perfluorobutanesulfonate) and the like.

The copolymers of isobutylene may include those wherein isobutylene is copolymerized with another monomer, which may be subsequently modified to include the pendent unsaturated group. Synthetic rubbers include butyl rubbers which are copolymers of mostly isobutylene with a small amount of isoprene, for example, butyl rubbers available under the tradenames VISTANEX (Exxon Chemical Co.) and JSR BUTYL (Japan Butyl Co., Ltd.). In some embodiments, the copolymers are substantially homopolymers of isobutylene, for example, polyisobutylene resins, which may be subsequently modified to include the pendent unsaturated group, available under the tradenames OPPANOL (BASF AG) and GLISSOPAL (BASF AG). The copolymers also include copolymers of mostly isobutylene with n-butene or butadiene, which may be subsequently modified to include the pendent unsaturated group. In some embodiments, a mixture of copolymers may be used, i.e., the first polyisobutylene comprises a homopolymer of isobutylene and the second polyisobutylene comprises butyl rubber, or the first polyisobutylene comprises butyl rubber and the second polyisobutylene comprises a copolymer of isobutylene, subsequently modified. Blends of isobutylene homopolymer and modified poly(isobutylene) are also contemplated.

The isobutylene copolymer may comprise a random copolymer of isobutylene and modified paramethylstyrene units, wherein said random copolymer contains 1 to 20% by weight of said modified paramethylstyrene units and has pendent dialkylamino groups. This random copolymer is, for example, commercially available from Exxon Chemical Co. under the trade name of EXXPRO series, and examples thereof include MDX90-10, MDX89-4. A portion of the methyl groups at the para-position of this paramethylstyrene can be brominated to form a site for the subsequent nucleophilic displacement as shown in Scheme 1. Accordingly, a crosslinked structure can be formed by the technique described in detail hereinafter. Particularly, regarding the copolymer MDX90-10, 1.2% by mol of paramethylstyrene, which is contained in the copolymer in the amount of 7.5% by weight, is brominated. Regarding MDX89-4, 0.75% by mol of paramethylstyrene, which is contained in the copolymer in the amount of 5% by weight, is brominated. In addition, bromination of paramethylstyrene and random polymerization between isobutylene and paramethylstyrene, for the purpose of producing a random copolymer, can be performed by known techniques.

Paramethylstyrene monomer units can also impart heat resistance and strength to the copolymer by the cohesive force and hardness of paramethylstyrene itself. To obtain such an effect, paramethylstyrene is preferably contained in the copolymer in amounts of greater than zero, preferably about 1 to 20 parts by weight based on the total amount of the copolymer. When the amount of paramethylstyrene is smaller than 1 part by weight, the cohesive force is insufficient and it becomes difficult to obtain enough adhesion to endure practical use. On the other hand, when the amount of paramethylstyrene is larger than 20 parts by weight, the flexibility is drastically lowered and the adhesion as an important characteristics of the adhesive disappears and, therefore, it becomes impossible to refer to it as a pressure-sensitive adhesive any longer.

Conventional adhesives do not adhere well to certain substrates, such as certain types of automotive paints and low energy surfaces. Efforts have been made to improve the adhesion of adhesives, i.e., develop more aggressive tack, to these types of surfaces; tackifying the base polymer is commonly practiced. Various types of tackifiers include phenol modified terpenes, hydrocarbon resins such as polyvinyl cyclohexane and poly(t-butyl styrene), and rosin esters such as glycerol esters of rosin and pentaerythritol esters of rosin.

Various types of tackifiers include phenol-modified terpenes and rosin esters such as glycerol esters of rosin and pentaerythritol esters of rosin that are available under the trade names Nuroz™, Nutac™ (Newport Industries), Permalyn™, Staybelite™, Foral™ (Eastman). Also available are hydrocarbon resin tackifiers that typically come from C5 and C9 monomers by products of naphtha cracking and are available under the trade names Piccotac™, Eastotac™, Regalrez™, Regalite™ (Eastman), Arkon™ (Arakawa), Norsolene™, Wintack™ (Cray Valley), Nevtack, LX (Neville Chemical Co.), Hikotack™, Hikorez™ (Kolon Chemical), Novares™ (Rutgers N.V.), Quintone™ (Zeon), Escorez™ (Exxonmobile Chemical), Nures™, and H-Rez™ (Newport Industries).

Conventional tackified pressure-sensitive adhesives can also appear cloudy, demonstrating a loss in the characteristic transparency found in many conventional pressure-sensitive adhesive compositions. The cloudiness is an indication of limited or incomplete compatibility of the tackifier and the polymers. The reduced compatibility can lead to a degradation of adhesive properties on aging, as evidenced by a loss of tack or reduced peel adhesion. In some cases, the addition of a tackifier to an adhesive composition can be clear and appear to be compatible. However, after removing the solvent, curing the adhesive, or on aging, the adhesive can become cloudy, indicating some incompatibility between the tackifier and acrylic base polymer.

In many embodiments, the present disclosure provides tackified adhesive compositions that overcome problems noted in the art. The tackifier is preferably selected from a material that is essentially free of any ethylenically or acetylenically unsaturated bonds. The tackifier includes, but is not limited to, hydrogenated rosin resins, hydrogenated and esterified rosin resins, hydrogenated terpene resins, aliphatic petroleum resins, aromatic petroleum resins, alicyclic petroleum resins obtained by hydrogenating aromatic petroleum resins, and the like. Preferably, the tackifier used is selected from hydrogenated $C_9$ petroleum resins such as but not limited to Regalrez™ tackifiers (Eastman) or Arkon™ (Arakawa) tackifiers. Such "hydrophobic tackifiers", may be used in amounts of greater than zero, e.g. 10 to 150 parts, preferably 10 to 100 parts, of said tackifier, relative to 100 parts of said isobutylene co)polymer.

Plasticizers may also be used in the adhesive formulation to provide wetting action and/or viscosity control. These plasticizers are well known in the art and may include hydrocarbon oils, liquid or soft tackifiers, including liquid hydrocarbon resins, liquid polyterpenes, liquid poly(isobutylenes) such as Glissopal™, and the like, waxes, and mixtures of oils. A plasticizer may be present in the pressure sensitive adhesive of the present invention in an amount of from 0 to about 200 parts by weight per 100 parts by weight of the copolymer.

The compositions of this disclosure optionally further comprise non-functional poly(isobutylene) polymers. The unfunctionalized isobutylene (co)polymeric synthetic rubbers are generally resins having a polyisobutylene main or a side chain. In some embodiments, the isobutylene (co)polymers are substantially homopolymers of isobutylene, for example, poly(isobutylene) resins available under the tradenames OPPANOL™ (BASF AG) and GLISSOPAL™ (BASF AG). In some embodiments, the isobutylene (co)polymeric resins comprise copolymers of isobutylene, for example, synthetic rubbers wherein isobutylene is copolymerized with another monomer. Synthetic rubbers include butyl rubbers which are copolymers of mostly isobutylene with a small amount of isoprene, for example, butyl rubbers available under the tradenames VISTANEX™ (Exxon Chemical Co.) and JSR™ BUTYL (Japan Butyl Co., Ltd.). Synthetic rubbers also include copolymers of mostly isobutylene with n-butene or butadiene. In some embodiments, a mixture of isobutylene homopolymer and butyl rubber may be used, i.e., a first polyisobutylene comprises a homopolymer of isobutylene and the second polyisobutylene comprises butyl rubber, or a first polyisobutylene comprises butyl rubber and a second polyisobutylene comprises a homopolymer of isobutylene.

The unfunctionalized isobutylene (co)polymeric synthetic rubber (e.g. PIB) material typically has substantially higher molecular weight than the amine-functionalized (e.g. PIB) synthetic rubber material (described further below). In some embodiments, the weight average molecular weight ($M_w$) of the unfunctionalized isobutylene (co)polymeric synthetic rubber (e.g. PIB) is at least 35,000 grams per mole, at least 100,000 grams per mole, at least 250,000 grams per mole, at least 500,000 grams per mole, or even at least 1,000,000 grams per mole. The weight average molecular weight is typically no greater than 4,000,000 g/mole.

The unfunctionalized isobutylene(co)polymeric synthetic rubber can be a homopolymer, copolymer, or a mixture thereof. Copolymers can be random or block copolymers. Block copolymers can include the polyisobutylene sections in the main backbone, in a side chain, or in both the main backbone and a side chain of the polymer. The polyisobutylene material is typically prepared by polymerizing isobutylene alone or by polymerizing isobutylene plus additional ethylenically unsaturated monomers, such as isoprene, in the presence of a Lewis Acid catalyst such as aluminum chloride, boron trichloride (with titanium tetrachloride as a co-catalyst), or boron trifluoride.

Unfunctionalized isobutylene(co)polymeric rubbers are commercially available from several manufacturers. Homopolymers are commercially available, for example, under the trade designation OPPANOL™ (e.g., OPPANOL™ B10, B15, B30, B50, B80, B100, B150, and B200) from BASF Corp. (Florham Park, N.J.). These polymers often have a weight average molecular weight ($M_w$) in the range of about 35,000 to 4,000,000 grams per mole. Still other exemplary homopolymers are commercially available from United Chemical Products (UCP) of St. Petersburg, Russia in a wide range of molecular weights. For example, homopolymers commercially available from UCP under the trade designation SDG have a viscosity average molecular weight ($M_v$) in the range of about 35,000 to 65,000 grams per mole. Homopolymers commercially available from UCP under the trade designation EFROLEN™ have a viscosity average molecular weight ($M_v$) in the range of about 480,000 to about 4,000,000 grams per mole. Homopolymers commercially available from UCP under the trade designation JHY™ have a viscosity average molecular weight in the range of about 3000 to about 55,000 grams per mole. These homopolymers typically do not have reactive double bonds. It is appreciated that the unfunctionalized (e.g. PIB) synthetic rubber may have a very small concentration of reactive double bonds or other functional groups that are residual to the polymerization thereof. The concentration of such reactive double bonds or other functional groups is typically less than 5, 4, 3, or 2 mol %. Such olefinic unsaturations are also typically not suitable functional groups for formation of covalent bonds via free-radical polymerization.

The concentration of unfunctionalized isobutylene(co) polymeric synthetic rubber material in the composition is typically less than 50 wt. %, preferably greater than 10 wt. %, relative to the total weight of the composition.

The adhesives of the present invention may be coated upon a variety of flexible and inflexible backing materials using conventional coating techniques to produce adhesive-coated materials. Flexible substrates are defined herein as any material which is conventionally utilized as a tape backing or may be of any other flexible material. Examples include, but are not limited to plastic films such as polypropylene, polyethylene, polyvinyl chloride, polyester (polyethylene terephthalate), polycarbonate, polymethyl(meth)acrylate (PMMA), cellulose acetate, cellulose triacetate, and ethyl cellulose. Foam backings may be used. Examples of inflexible substrates include, but are not limited to, metal, metallized polymeric film, indium tin oxide coated glass and polyester, PMMA plate, polycarbonate plate, glass, or ceramic sheet material. The adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating. These various methods of coating allow the compositions to be placed on the substrate at variable thicknesses thus allowing a wider range of use of the compositions. Coating thicknesses may vary, but coating thicknesses of 2-500 microns (dry thickness), preferably about 25 to 250 microns, are contemplated.

In some embodiments, the adhesive compositions, particularly pressure-sensitive adhesive compositions, are applied as a solvent solution or dispersion, the solvent evaporated, and the adhesive composition crosslinked on exposure to actinic radiation, such as UV. Crosslinking of such solvent-based compositions may occur before, but preferably occurs after coating and solvent removal. Suitable solvents such as alkanes, ethyl acetate, toluene and tetrahydrofuran which are unreactive with the functional groups of the components of the copolymer.

In other embodiments, such as hot-melt adhesive compositions, the adhesive is applied from the melt as is solvent-free. Hot melt coating a PSA composition eliminates the necessity of solvent processing. To hot melt process an adhesive composition, the composition must not be crosslinked before and during the coating process; however, to achieve a PSA with balanced properties (i.e., peel and shear adhesion), the composition eventually must be crosslinked. In hot melt coating processes, this is usually done by exposure to high energy radiation (e.g., E-beam or high intensity ultraviolet radiation). Commonly, when high intensity ultraviolet radiation is used, a photoactive crosslinking species such as benzophenone is added to the composition. Generally, the hot melt adhesive compositions require a narrower range of molecular weights for the poly(isobutylene) copolymer than do solution coated compositions. Too low and the crosslinked polymer has insufficient cohesive strength. Too high and the composition cannot be extrusion coated. Generally, the molecular weight of the unmodified poly(isobutylene) copolymer is from 50,000 to 5,000,000, preferably from 100,000 to 300,000 ($M_w$).

Conventional hot melt adhesives have poor adhesion at temperatures above their melting points and low heat resistance, which limits the use. Since conventional hot melt adhesives cannot maintain sufficient adhesion at high temperatures, they cannot be used in many applications. The instant compositions provide reactive hot melt adhesives that overcome this deficiency. As the instant adhesive compositions crosslink after bonding, they provide improved heat resistance.

The adhesive composition may be combined with a crosslinker and cured by actinic radiation. Suitable crosslinkers include, but are not limited to: aldehydes, such as benzaldehyde, acetaldehyde, and their substituted derivatives; ketones such as acetophenone, benzophenone and their substituted derivatives; quinones such as the benzoquinones, anthraquinone and their substituted derivatives; thioxanthones such as 2-isopropylthioxanthone and 2-dodecylthioxanthone; and certain chromophore-substituted halomethyl-triazines such as 2,4-bis-(trichloromethyl)-6-(3',4'-dimethoxyphenyl)-sym-triazine. The concentration of crosslinkers can be present in the range of 0.05 to 6.0 parts by weight, preferably 0.1 to 2 parts by weight, and more preferably 0.5 to 1.5 parts by weight relative to 100 parts by weight of the polymer component.

The photocrosslinking agent is a preferably a chromophore-substituted chloro-methyl-s-triazine crosslinking agent. In one embodiment, the crosslinking agent is as described in U.S. Pat. No. 4,330,590 (Vesley), and is of the formula:

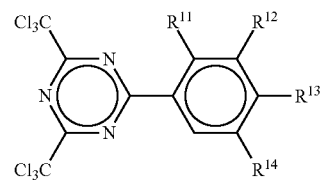

wherein: $R^{10}$, $R^{12}$, $R^{13}$, and $R^{14}$ are independently hydrogen, alkyl, or alkoxy; and 1-3 of the $R^{10}$, $R^{12}$, $R^{13}$, and $R^{14}$ groups are hydrogen. Preferably, the alkyl and alkoxy groups have no more than 12 carbon atoms, and often no more than 4 carbon atoms. Preferably, both $R^{12}$ and $R^{13}$ are alkoxy, because this tends to provide shorter reaction times. Adjacent alkoxy substituents may be interconnected to form a ring. The photoactive s-triazine component may be prepared by the co-trimerization of an aryl nitrile with trichloroacetonitrile in the presence of HCl gas and a Lewis acid such as $AlCl_3$, $AlBr_3$, etc., as described in *Bull. Chem. Soc. Japan*, Vol. 42, page 2924 (1969).

In another embodiment, the crosslinking agent is as described in U.S. Pat. No. 4,329,384 (Vesley), and is of the formula:

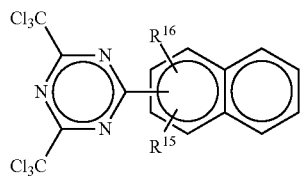

wherein: $R^{15}$ and $R^{16}$ are independently hydrogen, alkyl, or alkoxy. By this representation, it is meant that $R^{15}$ and $R^{16}$ can be on either of the fused rings. Preferably, any alkyl or alkoxy group of the photoactive s-triazine component has no more than 12 carbon atoms, and no more than two alkyl and alkoxy groups have more than 6 carbon atoms. In certain embodiments, they have no more than 4 carbon atoms, and the alkyl is often methyl or ethyl, and the alkoxy is often methoxy or ethoxy.

Adjacent alkoxy substituents may be interconnected to form a ring. The photoactive s-triazine component may be prepared by the co-trimerization of a polynuclear nitrile with trichloroacetonitrile in the presence of HCl gas and a Lewis acid such as AlCl$_3$, AlBr$_3$, etc. as described in *Bull. Chem. Soc. Jap.*, Vol. 42, pages 2924-2930 (1969).

Examples of suitable chlorinated triazine crosslinking agents include, but are not limited to, 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxy)phenyl)-s-triazine as described in U.S. Pat. No. 4,330,590 (Vesley), and 2,4-bis(trichloromethyl)-6-naphthenyl-s-triazine and 2,4-bis(trichloromethyl)-6-(4-methoxy)naphthenyl-s-triazine as described in U.S. Pat. No. 4,329,384 (Vesley).

The chlorinated triazine crosslinking agent is preferably a photo-crosslinking agent. More preferably, the triazine crosslinking agent is a chromophore-substituted chloro-methyl-s-triazine crosslinking agent, which can be prepared according to Wakabayashi et al., *Bull. Chem. Soc. Jap.*, Vol. 42, pages 2924-2930 (1969).

The adhesive composition can be cured using a source of actinic radiation of sufficient energy (i.e., wavelength range) to generate free radicals when incident upon the particular photoactive crosslinking agent selected for use in the composition. The preferable wavelength range for the photoactive crosslinking agents disclosed above is 400 to 250 nm. The radiant energy in this preferred range of wavelengths required to crosslink the adhesive film of the invention is 100 to 1500 millijoules/cm$^2$ and more preferably 200 to 800 millijoules/cm$^2$. Details of the photocure process are disclosed in U.S. Pat. No. 4,181,752 (Martens et al.) and U.S. Pat. No. 4,329,384 (Vesley et al.)

The adhesives of the present disclosure are particularly useful for forming strong bonds to low surface energy (LSE) substrates. As used herein, low surface energy substrates are those having a surface energy of less than about 45 dynes per centimeter, more typically less than about 40 dynes per centimeter, and most typically less than about 35 dynes per centimeter. Included among such materials are polypropylene, polyethylene (e.g., high density polyethylene or HDPE), polystyrene and poly(methyl methacrylate) (PMMA). Other substrates may also have properties of low surface energy due to a residue, such as an oil residue or a film such as paint, being on the surface of the substrate. However, even though the present adhesive bonds well to low surface energy surfaces, the invention is not limited to being bonded to low surface energy substrates, as it has been found that the inventive adhesive can also bond well to higher surface energy substrates such as, for example, other plastics, ceramics, glass and metals.

The substrate is selected depending on the particular application in which it is to be used. For example, the adhesive can be applied to sheeting products, (e.g., decorative graphics and reflective products), label stock, and tape backings. Additionally, the adhesive may be applied directly onto a substrate such as an automotive panel, or a glass window so that another substrate or object can be attached to the panel or window.

The adhesive can also be provided in the form of a pressure-sensitive adhesive transfer tape in which at least one layer of the adhesive is disposed on a release liner for application to a permanent substrate at a later time. The adhesive can also be provided as a single-coated or double-coated tape in which the adhesive is disposed on a permanent backing.

Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.), incorporated herein by reference. Those skilled in the art will also know that other additives such as fillers, antioxidants, stabilizers, and colorants may be blended with the adhesive for beneficial properties.

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the invention is disposed. The other layer of adhesive can be different from the adhesive of the invention, e.g., a conventional acrylic PSA, or it can be the same adhesive as the invention, with the same or a different formulation. Double coated tapes are typically carried on a release liner.

EXAMPLES

As used in the examples, pph refers to parts per hundred parts of the polymer. One hundred parts of polymer includes the total amount of modified polyisobutylene polymer and any unmodified polyisobutylene, e.g., MWPIB.

Test Methods:

90° Angle Peel Adhesion Strength Test.

Peel adhesion strength was measured at a 90° angle using an IMASS SP-200 slip/peel tester (available from IMASS, Inc., Accord Mass.) at a peel rate of 305 mm/minute (12 inches/minute) using the procedure described in ASTM International standard, D3330, Method F. Test panels were prepared by wiping the panels with a tissue wetted with the corresponding solvents shown in Table 1 using heavy hand pressure to wipe the panel 8-10 times. This procedure was repeated two more times with clean tissues wetted with solvent. The cleaned panel was allowed to dry. The adhesive tape was cut into strips measuring 1.27 cm×20 cm (½ in.×8 in.) and the strips were rolled down onto the cleaned panel with a 2.0 kg (4.5 lb.) rubber roller using 2 passes. The prepared samples were conditioned at 23° C./50% RH for 24 hours before testing. Two samples were tested for each example and averaged values were expressed in N/dm. Failure mode was noted and recorded as COH—cohesive, i.e., the adhesive split leaving residue on both the tape and test surface, ADH—adhesive, i.e., the adhesive peeled cleanly from the test surface, and 2-B (2-Bond)—the adhesive peeled away from the backing.

TABLE 1

Peel Adhesion Test Panel Materials and Cleaning Solvent

| Material | Solvent |
|---|---|
| HDPE—High density polyethylene | Isopropyl alcohol |
| PP—Polypropylene | Isopropyl alcohol |
| EPDM—Ethylene/propylene/diene monomer copolymer | Isopropyl alcohol |
| SS—Stainless Steel | Heptane |

Static Shear Strength

The static shear strength was evaluated as described in the ASTM International standard, D3654, Procedure A at 23° C./50% RH (relative humidity) using a 1000 g load. Tape test samples measuring 1.27 cm×15.24 cm (½ in.×6 in.) were adhered to 1.5 inch by 2 inch stainless steel (SS) panels using the method to clean the panel and adhere the tape described in the peel adhesion test. The tape overlapped the panel by 1.27 cm×2.5 cm. and the strip was folded over itself on the adhesive side, and then folded again. A hook was hung in the second fold and secured by stapling the tape above the hook. The weight was attached to the hook and the panels were hung in a 23° C./50% RH room or a 70° C. oven. The time to failure in minutes was recorded. If no failure was observed after 10,000 minutes, the test was stopped and a value of >10,000 minutes was recorded. The mode of failure described in the peel adhesion test was also noted.

Percent Gel Test

The percent gel was determined as described in the ASTM International standard, D3616-95. A round test specimen measuring $63/64$ inch in diameter was die-cut from a tape coated with the polymer and cured. The specimen was placed in a mesh basket measuring 1½ inch×1½ inch. The basket with the specimen was weighed to the nearest 0.1 mg and placed in a capped jar containing sufficient toluene to cover the sample. After 24 hours the basket (containing the specimen) was removed, drained and placed in an oven at 120° C. for 30 minutes. The percent gel was determined by calculating weight % of the remaining, unextracted portion to the original sample. A disc of the uncoated polyester backing material of the same size as the specimen was also die-cut and weighed. The formula used for percent gel determination is shown below:

Wt % Gel=((Unextracted sample wt. after extraction− uncoated backing wt.))×100(Original sample wt.−uncoated backing wt.)

Materials Used for Examples

ESCOREZ 5340—hydrocarbon based tackifier; Exxon-Mobil Corp.; Baytown Tex.

BIIR—Bromo Butyl 2030—brominated poly(isobutylene-co-isoprene) rubber; Lanxess Corporation; (Leverkusen, Germany)

MWPIB—OPPANOL B15 polymer—polyisobutylene (Medium MW 80K g/mol unfunctionalized synthetic rubber); BASF; Florham Park N.J.

Hostaphan® 3SAB—primed polyester film available from Mitsubishi, Greer S.C.

Crosslinker—2,4-bistrichloromethyl-6(3,4-dimethoxyphenyl)-s-triazine (a chromophore-substituted chloromethyl-s-triazine compound, which can be prepared according to Wakabayashi et al., *Bull. Chem. Soc. Jap.*, Vol. 42, pages 2924-2930 (1969))

The following materials were obtained from Sigma Aldrich; St. Louis Mo.

DBA—Dibutylamine, product number 240001 Aldrich; greater than 99% purity

DiBA—Diisobutylamine, product number 135186; 99% purity

Toluene

Preparation of Dibutylamine Modified Polyisobutylene (BIIR-DBA)

A modified isobutylene polymer was prepared by mixing 25.00 g of polyisobutylene (Bromo Butyl 2030 co-polymer) and 4.00 g of dibutylamine in a Brabender Type Six Mixer from C. W. Brabender Instruments, Inc.; Hackensack, N.J., mixer at 50° C. for 10 min with the rotation speed of 100 rpm. The mixture was removed from the mixer and allowed to cool to room temperature. The mixture was then dissolved in toluene at a concentration of 20% solids and the solution was added slowly to a glass beaker filled with acetone while agitating with a Teflon coated magnetic stirrer. The resulting polymer, a diisobutylene modified polyisobutylene as confirmed by NMR, precipitated out and the acetone was drained. The polymer was dried in a vacuum oven at room temperature.

Preparation of Diisobutylamine Modified Polyisobutylene (BIIR-DiBA)

A modified isobutylene polymer was prepared according to the procedure for DBA using 25.00 g of polyisobutylene (Bromo Butyl 2030 co-polymer) and 4.00 g of diisobutylamine. The diisobutylene polymer structure was identified by NMR.

Examples 1-4 and Control Examples C1-C2

Adhesive compositions for Examples 1-4 were prepared by adding 400 parts of toluene, 20 pph of tackifier (ESCOREZ 5340), and 0.2 pph of crosslinker, and 100 parts of polymer (total amount of either BIIR-DBA or BIIR-DiBA, and MWPIB) shown in Table 2, to 100 mL glass jars. The jars were capped and mixed on a roller mill overnight to form a coatable adhesive composition.

Adhesive compositions for Control Examples C1-C2 were prepared in the same manner with the same amounts and types of tackifiers except that BIIR or BIIR and MWPIB were used as the polymers as shown in Table 2, and no crosslinker was added.

The resulting compositions were each knife coated onto 15.2 cm by 63.5 cm strips of polyester primed film (Hostaphan® 3SAB) to a thickness of 15 mils wet. The coated films were dried in an oven set 70° C. for 20 minutes to provide tapes having an adhesive thickness of approximately 2 mils. The coated tapes, including the control tapes, were irradiated with UV light (600 mJ/cm$^2$, UVB) using a UV processor (Fusion UV System, Inc., Gaithersburg, Md.). The tapes were conditioned and tested according to the procedures described above for 90° Peel Adhesion, Static Shear Strength, and % gel. Results are shown in Table 3.

TABLE 2

Adhesive Compositions

| Ex | BIIR Parts | BIIR-DBA parts | BIIR-DiBA parts | MWPIB parts | Tackifier pph | Crosslinker pph |
|---|---|---|---|---|---|---|
| 1 | — | 100 | — | 0 | 20 | 0.2 |
| 2 | — | 70 | — | 30 | 20 | 0.2 |
| 3 | — | — | 100 | 0 | 20 | 0.2 |
| 4 | — | — | 70 | 30 | 20 | 0.2 |
| C1 | 100 | — | — | 0 | 20 | — |
| C2 | 70 | — | — | 30 | 20 | — |

TABLE 3

Adhesion and Shear holding properties

| Ex | Peel Adhesion Strength - N/dm | | | | | Shear Strength** Min | % Gel |
|----|----|----|----|----|----|----|----|
| | SS | PP | HDPE | EPDM | Santoprene | | |
| C1 | 30 | 68 | 24 | 55 | 138 | 3400 | 0 |
| C2 | 28 | 72 | 28 | 53 | 109 | 600 | 0 |
| 1 | 63 | 61 | 23* | 68 | 66 | 10,000+ | 40 |
| 2 | 60 | 76 | 20* | 47 | 58 | 2300 | 30 |
| 3 | 1* | 2* | 1* | 32 | 51 | 10,000+ | 49 |
| 4 | 37 | 21* | 9* | 48 | 44 | 2700 | 31 |

*failure mode was shocky peel
**failure modes of all shear tests were cohesive failures

What is claimed is:

1. An adhesive composition comprising: a) an isobutylene copolymer having pendent tertiary or quaternary amine groups, b) a photocrosslinking agent, and optionally c) a tackifier, wherein the isobutylene copolymer is of the formula;

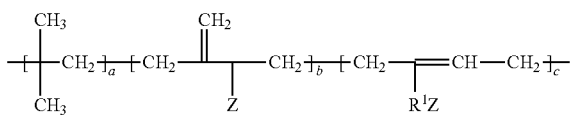

I wherein a is at least 20, and at least one of b and c are at least one, $R^1$ is a divalent alkylene and Z is a pendent tertiary or quaternary amine group.

2. The adhesive composition of claim 1 comprising greater than 0% by weight but less than 20% by weight of polymerized monomer units having pendent tertiary or quaternary amine groups.

3. The adhesive composition of claim 2 wherein the polymerized monomer units having pendent tertiary or quaternary amine groups are isoprene monomer units.

4. The adhesive composition of claim 1, wherein the pendent tertiary or quaternary amine groups are of the formulas: —$NR^2R^3$ and/or —$(NR^2R^3R^4)^+$, where $R^2$ is a $C_1$-$C_{18}$ (cyclo)alkyl, and each of $R^3$ and $R^4$ are independently a $C_1$-$C_{18}$ (cyclo)alkyl or an aryl group.

5. The adhesive composition of claim 1 comprising greater than 0 to 150 parts by weight of said tackifier per 100 parts by weight of said copolymer.

6. The adhesive composition of claim 1 comprising 10 to 100 parts by weight of said tackifier per 100 parts by weight of said copolymer.

7. The adhesive composition of claim 1 wherein the photocrosslinking agent is selected from aldehydes; ketones; quinones; thioxanthones and chromophore-substituted halomethyl-sym-triazines photocrosslinking agents.

8. The adhesive composition of claim 1 wherein the copolymer has a molecular weight (Mw) of 50,000 to 5,000,000.

9. The adhesive composition of claim 1 wherein Z is a $C_1$-$C_{18}$ dialkylamine group.

10. The adhesive composition of claim 1 comprising of 0.05 to 6.0 parts by weight of the photocrosslinking agent relative to 100 parts by weight of the isobutylene copolymer component.

11. The adhesive composition of claim 4 wherein $R^1$ is a phenylene.

12. The crosslinked adhesive composition of claim 1.

13. An adhesive article comprising a crosslinked coating of the adhesive of claim 1 on a backing.

14. The adhesive composition of claim 1, wherein the adhesive is a hot-melt adhesive.

15. An adhesive composition comprising the isobutylene copolymer of claims 1 and 1 to 50 wt. % tackifier, relative to the total weight of the composition.

16. The adhesive composition of claim 1 comprising:
a. greater than 30 wt. % isobutylene copolymer having pendent tertiary or quaternary amine groups;
b. 1 to 50 wt. % of tackifier, and
c. 10 to 50 wt. % non-functional poly(isobutylene).

17. The adhesive composition of claim 1, wherein said isobutylene copolymer having pendent tertiary or quaternary groups is prepared by nucleophilic displacement of a halogenated isobutylene copolymer, with a secondary or tertiary amine.

18. The adhesive composition of claim 1 wherein the photocrosslinking agent is a halomethyl-s-triazine crosslinking agent.

* * * * *